Patented June 2, 1953

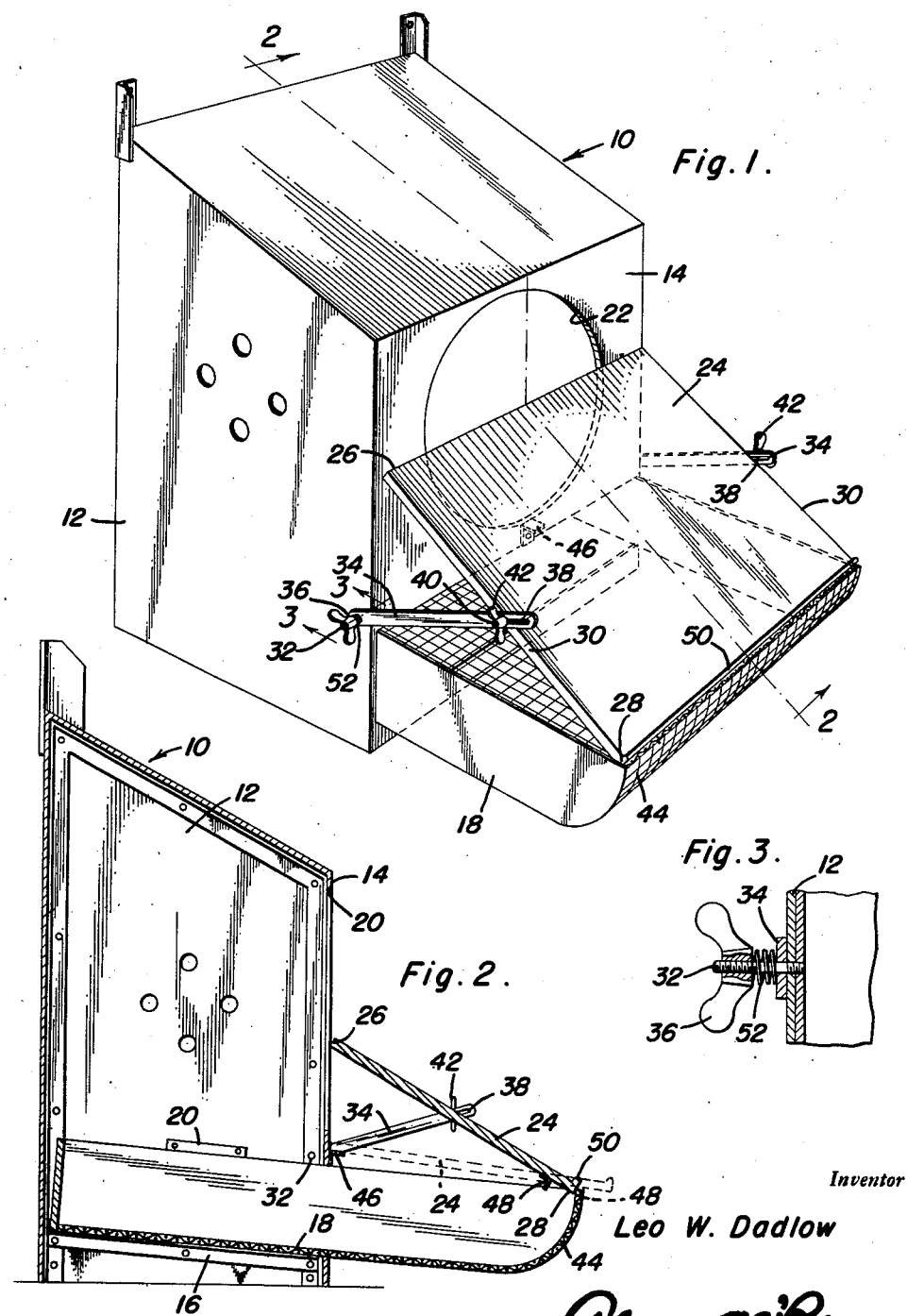

2,640,461

UNITED STATES PATENT OFFICE 2,640,461

NONROOSTING LID FOR NESTS

Leo W. Dadlow, La Porte, Ind., assignor of fifty per cent to Ida B. Dadlow, La Porte, Ind.

Application May 16, 1949, Serial No. 93,561

5 Claims. (Cl. 119—45)

This invention relates to new and useful improvements in poultry nests and the primary object of the present invention is to provide an anti-roosting lid for the poultry nest of my patent numbered 2,266,685, issued December 16, 1941.

Another very important object of the present invention is to provide an attachment for poultry nests that will prevent chickens from entering a nest at night and which is so constructed as to prevent chickens from roosting thereon.

A further object of the present invention is to provide a non-roosting lid that is quickly and readily applied to or removed from a poultry nest in a convenient manner.

A still further aim of the present invention is to provide a non-roosting lid of the aforementioned character that is simple and practical in construction, strong and reliable in use, neat and attractive in appearance, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of a hen's nest and showing the present invention applied thereon and partially closing the nest opening;

Figure 2 is a longitudinal vertical sectional view taken substantially on the plane of section line 2—2 of Figure 1 and with dotted lines showing the lid in its lowered position; and, Figure 3 is an enlarged sectional view taken substantially on the plane of section line 3—3 of Figure 1.

Referring now to the drawings in detail, wherein for the purpose of illustration, there is disclosed a preferred embodiment of the present invention, the numeral 10 represents a poultry nest generally, comprising a box-like housing having side walls 12, and a front wall 14.

Inclined guides 16 are secured adjacent the inner surfaces of the side walls 12 and slidably receive a nest box 18. Inclinedly disposed cleats 20 secured to the side walls 12 will bear against the upper edges of the nest box 18 to retain the nest box in a vertically inclined position.

The forward portion of the nest box projects forwardly from the front wall 14 and the nest box is open at its upper end.

The front wall 14 is provided with an opening 22 through which poultry may enter or pass out of the housing 10.

Means is provided for blocking the opening 22 so as to restrict the entrance of hens into the housing at night, thus preventing droppings from soiling the nest. This means comprises an anti-roosting lid or substantially rectangular panel 24 having an inner edge 26, an outer edge 28, and side edges 30.

A pair of threaded pins or bolts 32 project outwardly from the side walls 12 and are received in apertures provided in the inner ends of a pair of vertically swingable brace arms 34. Wing nuts 36 are received on the pins 32 in order to retain the arms 34 in a selected pivoted position.

The outer ends of the arms 34 are provided with longitudinal slots 38 that receive threaded lugs or bolts 40 projecting outwardly from substantially the central portions of the edges 30. Further wing nuts 42 are threaded on the lugs 40 for holding the panel 24 in a selected vertically inclined position.

In practical use of the panel 24 for partially blocking the opening 22, the edge 26 bears against the outer surface of the front wall 14 and the edge 28 bears against the inner surface of the forward wall 44 for the nest box 18 and both pairs of nuts 36 and 42 are tightened to retain the panel inclined as shown in both Figures 1 and 2. The slope of the panel 24 will also prevent poultry from roosting on the same.

In order that poultry may enter and pass outwardly from the housing 10, the panel 24 is lowered to its dotted line position as shown in Figure 2, by loosening the nuts 36 and 42, with the undersurface of the panel resting upon an angle member or support bracket 46 secured to the front wall 14 beneath the opening 22. An angle strip 48 secured to the undersurface of the panel 24 and spaced parallel to the edge 28 will bear against the wall 44 when the panel is lowered in order to prevent sliding movement of the panel and the member 46 will retain the panel inclined to prevent poultry from roosting thereon.

A rib 50 rises from the upper surface of the panel 24 adjacent the edge 28 and will function as a baffle to direct rain and droppings from the panel without permitting the rain or droppings from entering the nest box 18.

The rib 50 will also provide a footing means or traction surface to prevent hens from slipping off the panel when the hens are entering the nest.

It should be noted, that coil springs 52 are received on the pins 32 and are urged, by the nuts 36 against the arms 34 to yieldingly retain the arms in a selected pivoted position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a poultry nest including a box-like housing having an opening therein and a nest box partly disposed in the housing and beneath the opening; a non-roosting lid comprising a panel having inner and outer edges, the outer edge of said panel resting upon the nest box and the inner edge of said panel bearing against the housing to support the panel in a vertically inclined position, and means bracing said panel to said housing and locking the panel in a vertically inclined position, said panel partially blocking said opening, said bracing means constituting the sole means for attaching said panel to said housing.

2. In a poultry nest including a box-like housing having an opening therein and a nest box partly disposed in the housing and beneath the opening; a non-roosting lid comprising a panel having inner and outer edges, the outer edge of said panel bearing upon the nest box and the inner edge of said panel bearing against the housing, a pair of brace arms, threaded pins secured to the housing, said arms having openings receiving said pins for pivotal movement of said arms relative to said housing, nuts received on said pins for holding the arms in a selected pivoted position, threaded lugs secured to said panel, said arms having slots receiving said lugs, and further nuts received on said lugs for locking the arms to the panel.

3. The combination of claim 1 and means on said housing supporting the panel when the inner edge of the panel is disposed beneath the opening.

4. The combination of claim 3 wherein said means includes an angle member secured to said housing beneath the opening.

5. In a poultry nest including a housing having a forward wall with an opening therein, a pair of spaced parallel side walls connected to the forward wall, and a nest box disposed in the housing and having a forward end projecting outwardly from the forward wall below the opening, a non-roosting lid comprising a flat panel having inner and outer parallel edges, an angle iron strip on the under surface of said panel for engaging over the forward end of said nest box when the panel is lowered, a support member on said forward wall for supporting the panel when the panel is lowered to position the strip against the forward end of said nest box, a pair of arms pivotally mounted on the side walls of the housing for vertical swinging movement and constituting the sole means for securing said panel to the housing, and means pivotally and slidably adjustably securing said arms to said panel.

LEO W. DADLOW.

References Cited in the file of this patent
UNITED STATES PATENTS

| Number | Name | Date |
| --- | --- | --- |
| 442,434 | Harmer | Dec. 9, 1890 |
| 541,585 | Bennett | June 25, 1895 |
| 559,330 | Hill | Apr. 28, 1896 |
| 682,207 | Leisster | Sept. 10, 1901 |
| 959,843 | Cox et al. | May 31, 1910 |
| 979,138 | Ericson | Dec. 20, 1910 |
| 1,610,220 | Olson | Dec. 7, 1926 |
| 1,914,160 | Pine | June 13, 1933 |
| 1,916,790 | Guenser | July 4, 1933 |
| 1,917,371 | Hill | July 11, 1933 |
| 2,250,818 | Sperry | July 29, 1941 |
| 2,264,156 | Apple | Nov. 25, 1941 |
| 2,266,685 | Dadlow | Dec. 16, 1941 |